United States Patent [19]
Maddox et al.

[11] Patent Number: 5,898,296
[45] Date of Patent: Apr. 27, 1999

[54] ISOLATION REGULATOR

[75] Inventors: Harry Lee Maddox, Reynoldsburg; Bruce A. Singleton, Utica, both of Ohio

[73] Assignee: Lucent Technologies Inc., Murray Hill, N.J.

[21] Appl. No.: 09/024,442

[22] Filed: Feb. 17, 1998

[51] Int. Cl.$^6$ .............................. G05F 1/40; H04M 1/76; G05B 11/01
[52] U.S. Cl. .......................... 323/282; 379/416; 318/629
[58] Field of Search ................................... 379/416, 477; 318/629, 460; 323/282

[56] References Cited

U.S. PATENT DOCUMENTS

| | | | |
|---|---|---|---|
| 3,913,084 | 10/1975 | Bollinger et al. | 318/629 |
| 4,073,194 | 2/1978 | Willson et al. | 73/646 |
| 4,612,417 | 9/1986 | Toumani | 179/77 |
| 5,444,777 | 8/1995 | Condon et al. | 379/413 |
| 5,528,688 | 6/1996 | Schorr | 379/413 |
| 5,532,567 | 7/1996 | Iwasaki et al. | 318/701 |
| 5,659,610 | 8/1997 | Schorr et al. | 379/413 |

*Primary Examiner*—Matthew Nguyen
*Assistant Examiner*—Bao Q. Vu
*Attorney, Agent, or Firm*—Killworth, Gottman, Hagan & Schaeff, LLP

[57] ABSTRACT

An isolation regulator including a regulator circuit couples a source of power to an electrically noisy dc load connected in parallel with a load capacitor. Peak noise across the load is used to control the regulator circuit to set the current level to the load and determine the operating set point of the regulator circuit which includes a FET operated close to saturation to minimize the voltage drop across the FET. The illustrated electrically noisy dc load is a dc motor and the peak noise is the peak ripple across the motor which is monitored and compared to the saturation voltage of the FET. Positive peaks of the ripple, which could cause the FET to saturate, control the regulator circuit to reduce current flow and prevent saturation. Current provided by the regulator circuit increases gradually over time and is reduced as necessary by positive peak ripple signals to provide stable current flow to the dc motor. As illustrated, the dc motor drives a fan which cools associated electrical equipment. The temperature of the electrical equipment is monitored and used to control the operating set point of the FET and to generate an alarm signal if the temperature of the electrical equipment exceeds a maximum temperature. Operation of the dc motor is also monitored as is the current flow to the dc motor. An alarm signal is generated if the dc motor stops or if the current flow exceeds a maximum allowable current level.

24 Claims, 4 Drawing Sheets

ISOLATION REGULATOR

BACKGROUND OF THE INVENTION

The present invention relates in general to isolation of a direct current (dc) power supply from noise generated by an electrically noisy dc load, such as a dc motor, receiving power from the power supply and, more particularly, to an isolation circuit which also regulates power provided to the load from a dc power supply. While the present invention may be used in a variety of applications including electrically noisy loads such as dc motors, pulsing circuits, switching power supplies, solenoid drivers and the like, it will be described herein with reference to an isolation regulator used to drive a dc fan motor used to cool electrical equipment in a cellular telephone amplifier cabinet for which it is particularly applicable and initially being used wherein it isolates the dc fan motor from a battery system and regulates power provided to the dc fan motor from the battery system.

In a cellular telephone amplifier cabinet, power is provided to circuitry which processes cellular telephone signals by at least amplifying and normally performing other processing of the signals. For reliability, the power is provided by a battery system which has sufficient capacity to maintain the operation of the cabinet equipment for satisfactory periods of time to accommodate most interruptions of alternating current (ac) battery charging power which may occur. For similar reliability considerations, the battery system also provides power to other essential equipment within the cabinet including, for example, one or more dc motors which drive one or more cooling fans within the cabinet. Unfortunately, operation of dc motors produces large ripple currents and resulting ripple voltages. Any dc motor must be isolated from the battery system to reduce the ripple noise as well as other noise which can be generated by the motor and coupled into the battery system. If the isolation is insufficient, the resulting noise on the battery system can interfere with proper processing of the cellular telephone signals.

In the past, a pi filter including a large inductor has been used to isolate a dc fan motor from the battery system. However, due to the large inductance required, the filter is large, heavy and costly to assemble since assembly is manually performed. The filter also limits the size of the motor and the fan since only a defined amount of space is allocated to the fan/filter combination, particularly in existing cabinet designs.

It is apparent that there is a need for an improved arrangement for isolating electrically noisy dc loads, such as dc motors, from dc power supplies, such as battery systems, which arrangement is substantially smaller than currently used filters, comparatively lighter in weight, lower in cost and which lends itself to automated production. Preferably, the improved arrangement would regulate power provided to the noisy loads and would perform additional functions currently performed by components provided in addition to currently used filters. For example in the case of a dc fan motor, alarms could be generated to warn of impending failure of the motor, the temperature of associated electrical equipment cooled by operation of the motor could be monitored and the speed of the motor could be controlled based on the temperature of the cooled equipment.

SUMMARY OF THE INVENTION

This need is met by the methods and apparatus of the present invention wherein a pi filter is replaced by an isolation regulator including a regulator circuit which couples a source of power to an electrically noisy dc load connected in parallel with a load capacitor. Peak noise across the dc load is monitored and used to control the regulator circuit to both set the current level provided to the dc load and also to determine the operating set point of the regulator circuit. In particular, in the illustrated embodiment, the regulator circuit includes a field effect transistor (FET) which is operated close to saturation to minimize the voltage drop across the FET while maintaining current regulation and thereby maximizing performance of the motor. The electrically noisy dc load in the illustrated embodiment is a dc motor and the peak noise or ripple across the dc motor is monitored and compared to a voltage level which is set to the saturation voltage of the FET. The positive peaks of the ripple signal, which could cause the FET to saturate, are used to control the regulator circuit to reduce the current flow and prevent saturation of the FET. Current provided by the regulator circuit increases gradually over time and is reduced as necessary by detected positive peak ripple signals so that a stable current flow is maintained to the dc motor and dc motor capacitor connected across the dc motor.

In the illustrated embodiment, the dc motor drives a fan which cools associated electrical equipment and the temperature of the electrical equipment is monitored and used to control the operating set point of the FET and also to generate an alarm or error signal if the temperature of the electrical equipment exceeds a maximum temperature. Operation of the dc motor is also monitored as is the current flow to the dc motor. An alarm or error signal is generated if the dc motor stops or if the current flow exceeds a maximum allowable current level indicating the dc motor is nearing the end of its useful life.

It is, thus, an object of the present invention to provide an improved arrangement for isolating electrically noisy dc loads, such as dc motors, from dc power supplies, such as battery systems, which arrangement is substantially smaller, lighter in weight and less expensive than currently used isolation filters; to provide an improved arrangement for isolating electrically noisy dc loads from dc power supplies wherein power provided to the loads is regulated; and, to provide an improved arrangement for isolating electrically noisy do loads from do power supplies wherein the dc load is a dc fan motor used to cool associated electrical equipment and the temperature of the electrical equipment and/or motor current level and/or motor operation is monitored to generate appropriate alarm or error signals indicating operational status of the dc motor.

DETAILED DESCRIPTION OF THE INVENTION

The present invention will be described herein with reference to driving a dc fan motor used to cool electrical equipment in a cellular telephone amplifier cabinet for which it is particularly applicable and initially being used. However, it is noted that the isolation regulator of the present invention is generally applicable to driving a variety of electrically noisy loads including not only dc motors but also pulsing circuits, switching power supplies, solenoid drivers and the like as will be apparent.

Figure 1:
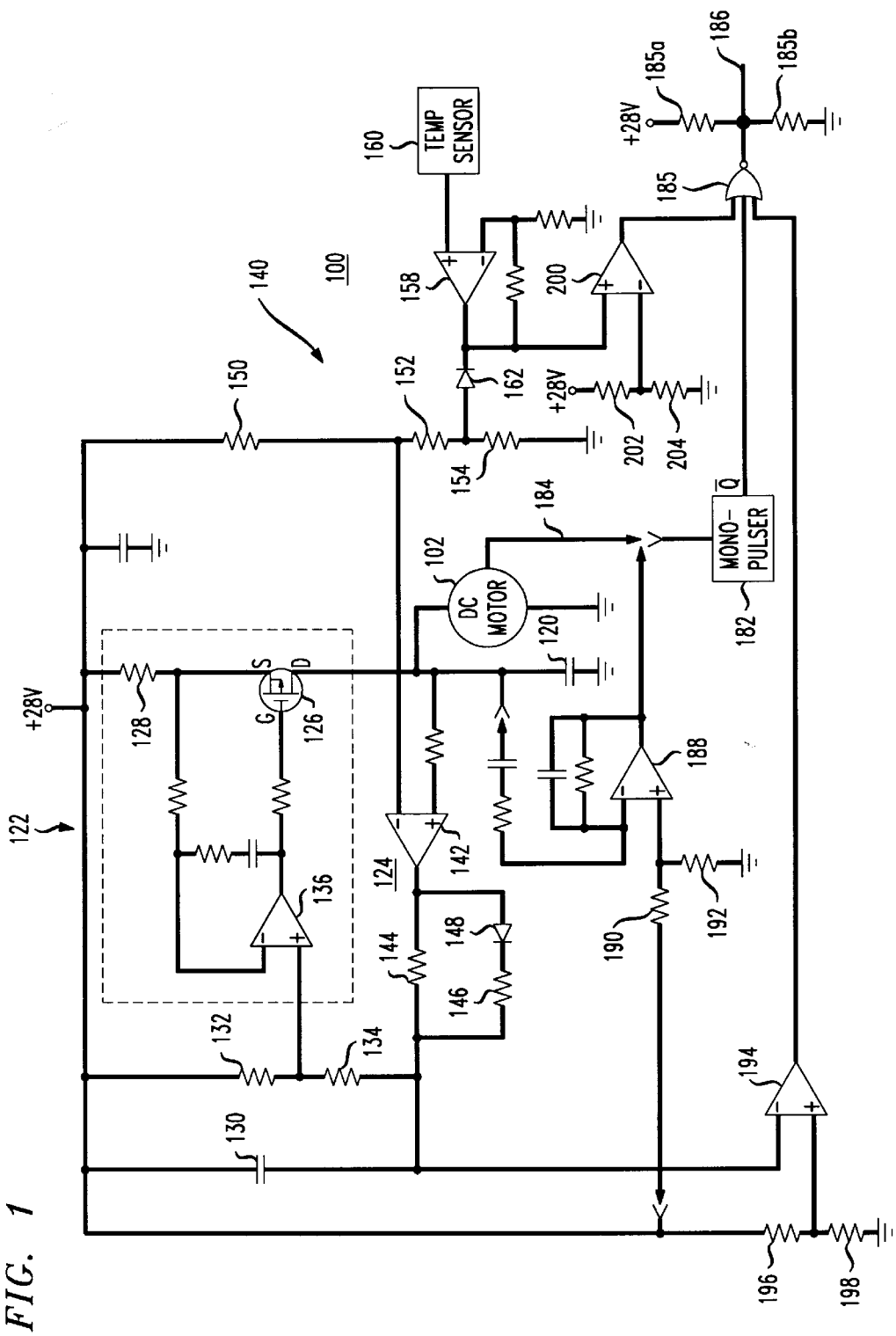
FIG. 1 is an electrical schematic diagram of an isolation regulator in accordance with the present invention for providing power to an electrically noisy dc load, a dc motor, and isolating a do power source, a battery system, from noise generated by the motor.
Figure 2:
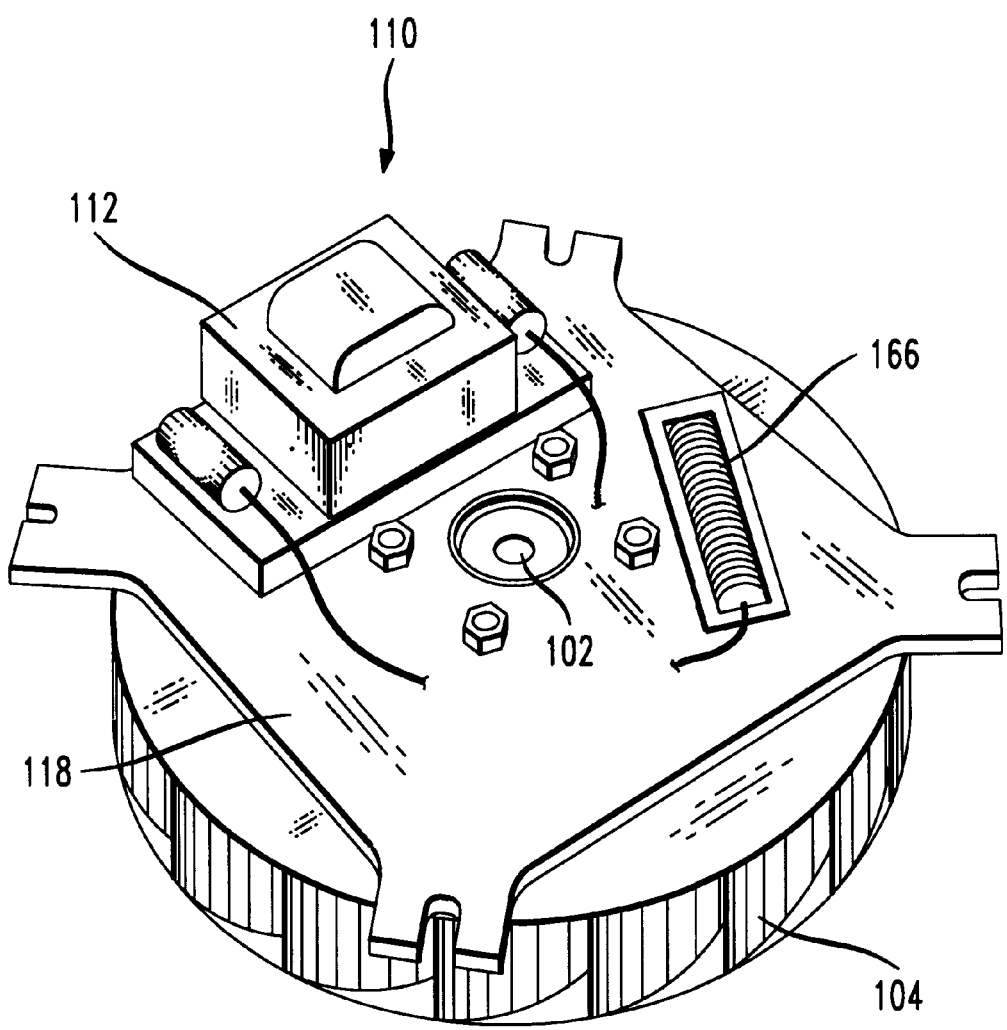
FIG. 2 is a perspective view of an existing cooling fan used for a cellular telephone amplifier array illustrating a pi filter used to isolate the dc fan motor from a battery system used to power the amplifier array and including a large inductor.
Figure 3:
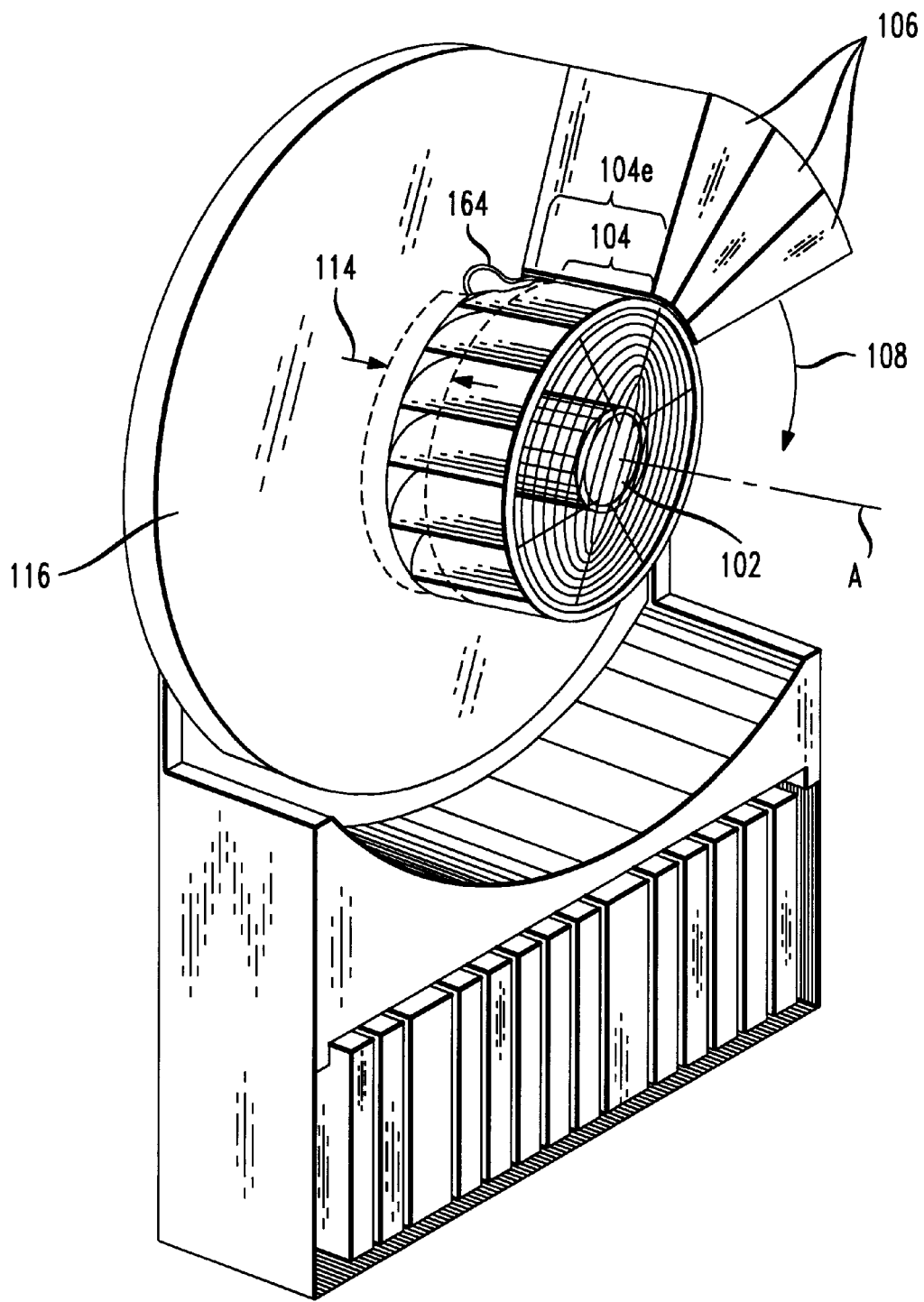
FIG. 3 is a perspective view of a cellular telephone amplifier array including only three amplifiers and an expanded width fan, the use of which is enabled by the isolation regulator of the present invention.

Reference will now be made to FIG. 1 which is an electrical schematic diagram of an illustrative embodiment of an isolation regulator 100 of the present invention. As illustrated, the isolation regulator 100 drives a dc motor 102 which is coupled to a fan 104, see FIGS. 2 and 3, used to cool electrical equipment and, more particularly, cellular telephone amplifiers 106, only three of which are shown in FIG. 3. The amplifiers 106 are formed as segments of an annular array of amplifiers which extend entirely around the fan 104 for a fully equipped cellular telephone amplifier cabinet. The annular array of cellular telephone amplifiers 106 can be envisioned by expanding the number of amplifiers beyond the three illustrated amplifiers 106 so that they extend entirely around an axis A of the annular array with additional amplifiers being added, for example, in the direction of an arrow 108. The cellular telephone amplifiers 106 have radially extending air passages (not shown) through which air driven by the fan 104 passes for cooling the amplifiers.

The segmented packaging structure of cellular telephone amplifiers 106 facilitates cooling of the array of amplifiers and increases the effectiveness of the fan 104. Even so, during peak operating periods of the telephone amplifiers 106, additional cooling would be advantageous. Unfortunately, a pi filter 110 including a large inductor 112 limits the width and hence cooling capacity of the fan 104 since a minimum amount of spacing 114 is required between the surface 116 against which the amplifiers 106 are mounted and the back of a fan mounting plate 118, see FIGS. 2 and 3. The isolation regulator 100 of the present invention replaces the pi filter with a thin printed circuit package embodying the circuitry of FIG. 1 thereby eliminating the inductor 112 and enabling enlargement of the fan 104 to an expanded width 104e. The isolation regulator 100 also regulates current flow to the dc motor 102 and can perform functions which are performed by other circuitry and components within an existing cellular telephone amplifier cabinet.

Referring again to FIG. 1 the isolation regulator 100 for providing power to an electrically noisy dc load, the the dc motor 102 as illustrated, comprises a load or dc motor capacitor 120 connected across the dc motor 102. A regulator circuit 122 is coupled between a source of power (+28 V), a battery system in the illustrated cellular telephone amplifier cabinet, and the dc motor 102 to control current flow to the parallel combination of the dc motor capacitor 120 and the dc motor 102. A peak noise detector circuit 124 is coupled between the dc motor 102 and the regulator circuit 122 for controlling the regulator circuit 122 in response to peak noise or ripple across the dc motor 102 to provide a stable current flow to the parallel combination of the dc motor capacitor and the dc motor 102.

Figure 5:
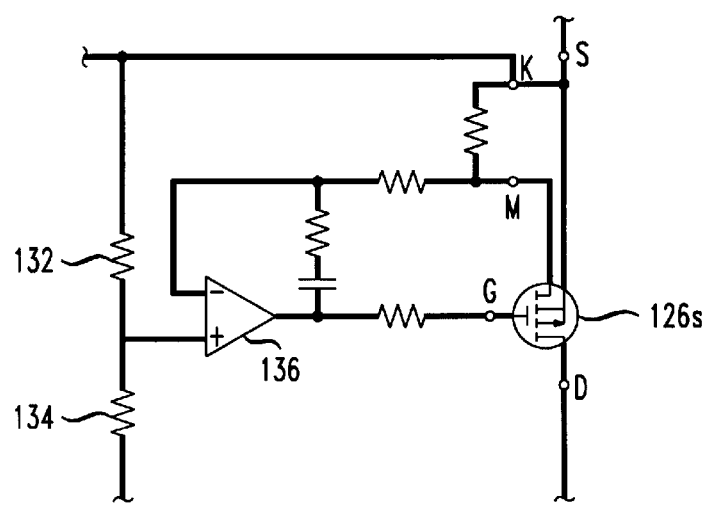
FIG. 5 is an electrical schematic diagram of a regulator circuit using a current sensing FET.

While a variety of transistors can be used in the present invention, as illustrated, the regulator circuit 122 comprises a p-channel field effect transistor (FET) 126 coupled between the power source (+28 V) and the dc motor 102 with the current through the FET 126 being monitored by a sensor 128, illustrated in FIG. 1 as a resistor having a small resistance value connected in series with the FET 126. Alternately, a current sensing FET 126s can be used with the sensor 128 then comprising a sense element of the current sensing FET 126s. The current sensing FET 126s and associated circuitry for operation in the regulator circuit 122 are schematically illustrated in FIG. 5. Current sensing FET's are commercially available from a variety of manufacturers including Motorola which sells current sensing FET's under the trademark Sensefet and International Rectifier Corporation which sells current sensing FET's under the trademark Hexsense.

A current level circuit of the regulator circuit 122 comprises a current setting capacitor 130 coupled between the source of power (+28 V) and the peak noise detector circuit 124, and a current level selector formed by resistors 132, 134 which form a voltage divider circuit. A current regulator operational amplifier 136 having a first input coupled to the sensor 128, a second input coupled to the junction of the resistors 132, 134 of the current level circuit and an output coupled to a gate of the FET 126.

The peak noise detector circuit 124 comprises a set point circuit 140 for determining an operating point for the regulator circuit 122, and a peak noise detector operational amplifier 142 having a first input connected to the dc motor 102, a second input connected to the set point circuit 140 and an output coupled to the regulator circuit 122 through a resistor 144 and the series combination of a resistor 146 and a diode 148. The set point circuit 140 may comprise a voltage divider circuit made up of resistors 150 and the series combination of resistors 152, 154, which would be combined into a single resistor if a simple voltage divider circuit is used. However, as illustrated, the set point circuit 140 further comprises a temperature monitoring operational amplifier 158 which receives an input signal from a temperature sensor 160 and is coupled to the junction between the resistors 152, 154 by a diode 162. The illustrated embodiment of the set point circuit 140 utilizes the temperature of electrical equipment being cooled by the fan 104 to determine the operating point for the regulator circuit 122.

The temperature sensor 160 preferably comprises a commercially available LM35 sensor which provides a 10 millivolt/° C. output signal. However, the temperature of the electrical equipment being cooled can also be sensed using a thermistor as the temperature sensor 160 as will be apparent to those skilled in the art. In either event, the temperature sensor 160 is preferably placed in contact with one of the cellular telephone amplifiers 106 or, more specifically, with a heat sink forming a portion of one of the cellular telephone amplifiers 106 using a spring element 164, see FIG. 3, or other conventional mounting arrangement. Preferably, the temperature sensor would be thermally insulated except for where it contacts one of the cellular telephone amplifiers 106 so that its temperature would not be influenced by the temperature of the air circulated by the fan 104 and thereby accurately reflect the temperature of the electrical equipment being cooled. Such direct monitoring is in contrast to temperature monitoring currently performed by a thermistor 166 mounted on the fan mounting plate 118, see FIG. 2, which detects the temperature of air being used to cool the electrical equipment rather than the equipment itself.

Figure 4:
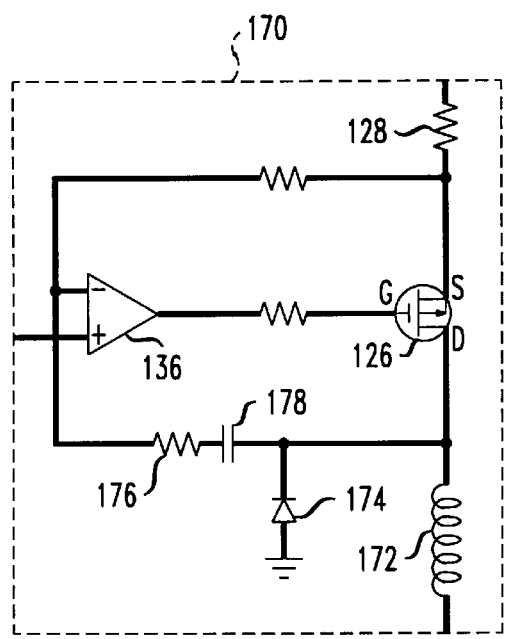
FIG. 4 is an electrical schematic diagram of a switching regulator which can be used in the isolation regulator of FIG. 1.

If desired, a switching regulator 170, illustrated in FIG. 4, can be used in the isolation regulator 100 to replace the circuitry within the dotted line box of FIG. 1. Like elements of the switching regulator 170 have been labeled the same with an inductor 172, a diode 174 and positive feedback of a resistor 176 and a capacitor 178 being added for the switching regulator 170. Operation of the switching regulator 170 is conventional as will be understood by those skilled in the art.

With this understanding of the structure of the basic isolator regulator 100 which has been described above, operation of the basic isolator regulator 100 will now be described. Two control loops are operating in the isolator regulator 100, the first current regulation loop of the regulator circuit 122 and the second set point/peak noise detection loop of the peak noise detector circuit 124. To minimize the voltage drop across the FET 126 while maintaining current regulation and thereby maximize performance of the motor 102, the FET 126 is normally set to operate as close to saturation as possible but not to enter saturation which would defeat electrical noise isolation. Accordingly, the voltage divider made up of the resistors 150,152,154 or set point circuit 140 is set to the saturation voltage of the FET 126. The peak noise detector operational amplifier 142 compares the peak noise or ripple on the dc motor 102 to the saturation voltage set by the set point circuit 140 and controls the regulator circuit 122 to maintain the FET 126 near saturation but never allowing the FET 126 to saturate.

Control of the regulator circuit 122 is through the charging and discharging of the capacitor 130. The capacitor 130 is quickly discharged by current flow through the diode 148 and resistor 146 which reduces the voltage across the capacitor 130 reducing the amount of current the FET 126 provides. When not being discharged, the capacitor 130 slowly charges through the resistor 144 so that the current from the FET slowly increases over time until noise or ripple peaks cause the capacitor 130 to be discharged. Thus, a stable current flow is provided to the parallel combination of the dc motor load capacitor 120 and the dc motor 102 to maintain the motor at its nominal operating speed while the FET 126 is maintained very close to saturation to minimize the voltage drop across the FET 126.

Temperature sensing, as disclosed in the illustrated embodiment, provides added control of the dc motor 102 for temperatures below a selected temperature level. For temperatures below the selected temperature level, such as 70° C., will reduce the set point voltage so that the FET 126 is not operated near saturation and more voltage is dropped across the FET 126. The temperature control of the FET 126 thus increases the power dissipation within the FET 126 and reduces the operating speed of the dc motor 102. When operated at lower ambient temperatures, for example in northern environments, the reduce fan speed is an advantage as it extends the life of the fan and reduces audible noise generated by operation of the fan which can be of concern in some application. In addition, the additional energy dissipation in the FET 126 generates heat which can be beneficial for operation of the electrical equipment. In any event, as the temperature rises above the selected temperature, the diode 162 is reversed biased and the temperature of the equipment has no impact on the operating set point for the FET 126 and the operation of the dc motor 102. The temperature sensing circuitry can be used for alarm purposes which is an additional feature of the present invention as will be describe with reference to the remainder of the circuitry of FIG. 1.

As shown in FIG. 1, continued operation of the dc motor 102 can be sensed by means of a retriggerable monopulser 182 which is triggered by an output signal generated by the dc motor 102 on an electrical conductor 184. The output signal can be generated, for example, by a Hall Effect device mounted within the dc motor 102. As long as the dc motor 102 is operating, the output signal on the conductor 184 retriggers the monopulser 182 so that it never times out. If the dc motor 102 stops running, the monopulser 182 is not retriggered, times out and generates an output signal which is passed to a NOR gate 185 to generate an alarm or error signal on an output 186 of the NOR gate 185. To simplify the dc motor 102, the signal which resets the monopulser 182 can be generated by monitoring the ripple signal on the motor 102 using an operational amplifier 188 having a first input connected to the dc motor 102 and a second input connected to a divider circuit formed by resistors 190, 192. The required reset time of the monopulser 182 is then selected for the resulting motor operating signal, which is proportional to the speed of the dc motor 102, for example the frequency of the motor operating signal is equal to the speed of the motor multiplied by the number of poles of the dc motor 102.

It is preferable to provide an error signal which indicates that the dc motor 102 needs to be replaced or serviced rather than that the dc motor 102 has stopped since such signals permit action to be taken before complete failure of the dc motor 102. To that end, the motor current is monitored and an error signal is also generated if motor current exceeds a defined current limit. For example, if the dc motor 102 requires 1 amp during normal operation when new, as the motor ages and the bearings impose more and more load on the motor, the motor requires more and more current to drive not only the fan but also the increasing load presented by the aging bearings. At a defined current level, for example 1.5 amps, an error signal can be generated to indicate that the motor is nearing the end of its life and should be replaced. In the present invention, dc motor 102 current is monitored by sensing the voltage on the current setting capacitor 130 using an operational amplifier 194 with the preset current error level being set by a voltage divider circuit formed by resistors 196, 198. The output of the operational amplifier 194 is also passed to the NOR gate 185 to generate an error signal indicating excessive motor current.

It is also desirable to generate an error signal if the sensed temperature of the electrical equipment being cooled by the fan 104 exceeds a defined temperature. To generate this alarm, the output signal from the temperature monitoring operational amplifier 158 is monitored by an operational amplifier 200 and compared to a signal generated by a voltage divider circuit formed by resistors 202, 204 which sets a defined maximum permissible operating temperature above which an error signal is to be generated. The output of the operational amplifier 194 is also passed to the NOR gate 185 to generate an error signal indicating that the operating temperature of the electrical equipment is too high.

It is preferred to select the NOR gate 185 to have an open collector output which provides a ground level error or alarm signal. In this way an error signal is also generated if power is lost when the circuit is configured as shown in FIG. 1 with resistors 185a and 186b connected between +28 V and ground and selected to provide an appropriate logic level output voltage when no error is present. While motor speed, motor current, temperature of electrical equipment being cooled and power loss have been combined to generate a single alarm or error signal, is should be apparent that these conditions can be used to generate individual error signals if desired.

In FIG. 5, the current sensing FET 126s is illustrated as a P channel FET provided in a 5 pin package: D—drain; S—source; G—gate; K—Kelvin; and, M—mirror. Preferably, the current level circuit of the regulator circuit 122 is connected to the K pin of the current sensing FET 126s. The circuit can be inverted such that it can operate from the most negative rail. The inverted circuit configuration would use an N channel current sensing FET as opposed to a P channel current sensing FET. Since the circuitry required for such an inverted circuit would be apparent to those skilled in the art, it will not be described herein. Advantages of using a current sensing FET include elimination of the voltage drop across a sensing resistor, such as the resistor 128, and the associated power dissipation within the high current sensing resistor. Of course, current sensing FET's are more expensive.

The isolation regulator 100 of the present application can also be applied to power systems used to drive transmitters in satellites, sonar buoys and the like wherein very large capacitors are charged from battery systems over time and discharged for brief periods of time at high rates for burst transmissions of data. Thus, large currents are drawn from the capacitors during the short burst transmission times. The isolation regulator 100 isolates the battery system from voltage dips which occur across the capacitor as it is being discharged to prevent faults in other circuitry powered by the battery system and, for the switching version of the circuitry, provides efficient current limited recharging of the large capacitors in preparation for the next transmission burst.

While methods of regulating power provided to a noisy dc load from a power source and isolating the noisy dc load from the power source are believed to be apparent from the above description, for sake of clarity, an illustrative method in accordance with the present invention will now be described briefly. Such a method comprises the steps of connecting a load capacitor across a noisy dc load, such as the dc motor 102, and controlling a current regulator circuit to provide a stable current flow to the load capacitor and the noisy dc load. An operating point is set for the current regulator and peak noise is detected on the noisy dc load. The stable current flow to the load capacitor and the noisy dc load is controlled in response to peak noise detected on the load and the set operating point for the current regulator circuit.

The method may further provide for generating an alarm signal and may further comprise the steps of monitoring the stable current flow, and generating an alarm signal in response to the stable current flow exceeding a defined stable current flow level. When the noisy dc load comprises a dc motor used to drive a fan for cooling electrical equipment, the method may further comprise the steps of monitoring the temperature of the electrical equipment, and regulating the stable current flow to the load capacitor and the dc motor in response to the temperature of the electrical equipment. The method may further comprise the step of generating an alarm signal in response to the temperature of the electrical equipment exceeding a predefined temperature. When the noisy dc load comprises a dc motor used to drive a fan for cooling electrical equipment, the method may further provide for indicating continued operation of the motor and further comprise the step of generating a dc motor signal indicating continued operation of the dc motor. For a noisy dc load comprising a dc motor, the detected electrical noise on the motor is ripple and the step of generating a dc motor signal indicating continued operation of the dc motor comprises the step of generating a signal which alternates at a frequency which is equal to the frequency of detected ripple on the motor.

Having thus described the invention of the present application in detail and by reference to preferred embodiments thereof, it will be apparent that modifications and variations are possible without departing from the scope of the invention defined in the appended claims.

What is claimed is:

1. An isolation regulator for providing power to an electrically noisy dc load comprising:
    a load capacitor connected across a noisy dc load;
    a regulator circuit coupled between a source of power and said noisy dc load to control current flow to the parallel combination of said load capacitor and said noisy dc load; and
    a peak noise detector circuit coupled between said noisy dc load and said regulator circuit for controlling said regulator circuit in response to peak noise across said load to provide a stable current flow to said parallel combination of said load capacitor and said noisy dc load.

2. An isolation regulator as claimed in claim 1 wherein said peak noise detector circuit comprises:
    a set point circuit for determining an operating point for said regulator circuit; and
    a peak noise detector operational amplifier having a first input connected to said dc load, a second input connected to said set point circuit and an output coupled to said regulator circuit.

3. An isolation regulator as claimed in claim 2 wherein said noisy dc load comprises a dc motor used to drive a fan for cooling electrical equipment and said set point circuit comprises a thermistor for monitoring temperature of said electrical equipment.

4. An isolation regulator as claimed in claim 2 wherein said set point circuit comprises a voltage divider circuit connected between said source of power and a ground potential.

5. An isolation regulator as claimed in claim 4 wherein said noisy dc load comprises a dc motor used to drive a fan for cooling electrical equipment and said set point circuit further comprises a thermistor coupled to said voltage divider circuit for monitoring temperature of said electrical equipment, said thermistor being coupled to said voltage divider circuit to control a voltage generated by said voltage divider circuit in response to said temperature of said electrical equipment.

6. An isolation regulator as claimed in claim 1 wherein said regulator circuit comprises:
    a field effect transistor coupled between said source of power and said noisy dc load; and
    a sensor for sensing current flow through said field effect transistor.

7. An isolation regulator as claimed in claim 6 wherein said sensor comprises a resistor connected in series with said field effect transistor.

8. An isolation regulator as claimed in claim 6 wherein said field effect transistor comprises a current sensing field effect transistor and said sensor comprises a sense element of said current sensing filed effect transistor.

9. An isolation regulator as claimed in claim 6 wherein said regulator circuit further comprises:
    a current level circuit for setting a level of stable current flow to be maintained by said regulator circuit; and
    a current regulator operational amplifier having a first input coupled to said sensor, a second input coupled to said current level circuit and an output coupled to a gate of said field effect transistor, said peak noise detector circuit being coupled to said current level circuit of said regulator circuit.

10. An isolation regulator as claimed in claim 9 further comprising an alarm circuit coupled to said current level circuit to generate an alarm signal if a current level set by said current level circuit exceeds a defined current level.

11. An isolation regulator as claimed in claim 9 wherein said current level circuit comprises:

a current setting capacitor coupled between said source of power and said peak noise detector circuit; and a current level selector coupled between said current setting capacitor and said second input of said current regulator operational amplifier.

12. An isolation regulator as claimed in claim 11 wherein said current level selector comprises a voltage divider circuit coupled across said current setting capacitor and defining an output coupled to said second input of said current regulator operational amplifier.

13. An isolation regulator as claimed in claim 12 wherein said peak noise detector circuit comprises:

a set point circuit for determining an operating point for said regulator circuit; and a peak noise detector operational amplifier having a first input connected to said noisy dc load, a second input connected to said set point circuit and an output coupled to said current setting capacitor.

14. An isolation regulator as claimed in claim 13 wherein said peak noise detector circuit further comprises a peak detector circuit coupling said output of said peak noise detector operational amplifier to said current setting capacitor.

15. An isolation regulator as claimed in claim 14 wherein said peak detector circuit comprises a diode and a resistor connected in series between said output of said peak noise detector operational amplifier and said current setting capacitor.

16. An isolation regulator as claimed in claim 15 wherein said peak noise detector circuit further comprises a resistor connected in parallel with said series combination of said diode and said resistor.

17. An isolation regulator as claimed in claim 16 wherein said noisy dc load comprises a dc motor and said peak noise detector comprises a peak ripple detector.

18. An isolation regulator as claimed in claim 1 wherein said regulator circuit comprises a switching regulator.

19. A method of regulating power provided to a noisy dc load from a power source and isolating said noisy dc load from said power source, said method comprising the steps of:

connecting a load capacitor across a noisy dc load;

controlling a current regulator circuit to provide a stable current flow to said load capacitor and said noisy dc load;

setting an operating point for said current regulator circuit;

detecting peak noise on said noisy dc load; and regulating said stable current flow to said load capacitor and said noisy dc load in response to peak noise detected on said load and said set operating point for said current regulator circuit.

20. A method of regulating power provided to a noisy dc load from a power source and isolating said noisy dc load from said power source as claimed in claim 19 wherein said method further provides for generating an alarm signal and further comprising the steps of:

monitoring said stable current flow; and generating an alarm signal in response to said stable current flow exceeding a defined stable current flow level.

21. A method of regulating power provided to a noisy dc load from a power source and isolating said noisy dc load from said power source as claimed in claim 19 wherein said noisy dc load comprises a dc motor used to drive a fan for cooling electrical equipment, said method further comprising the steps of:

monitoring temperature of said electrical equipment; and regulating said stable current flow to said load capacitor and said dc motor in response to said temperature of said electrical equipment.

22. A method of regulating power provided to a noisy dc load from a power source and isolating said noisy dc load from said power source as claimed in claim 21 further comprising the step of generating an alarm signal in response to said temperature of said electrical equipment exceeding a predefined temperature.

23. A method of regulating power provided to a noisy dc load from a power source and isolating said noisy dc load from said power source as claimed in claim 19 wherein said noisy dc load comprises a dc motor used to drive a fan for cooling electrical equipment, said method further providing for indicating continued operation of said motor and further comprising the step of generating a dc motor signal indicating continued operation of said dc motor.

24. A method of regulating power provided to a noisy dc load from a power source and isolating said noisy dc load from said power source as claimed in claim 23 wherein said detected noise on said motor is ripple and said step of generating a dc motor signal indicating continued operation of said dc motor comprises the step of generating a signal which alternates at a frequency which is equal to the frequency of detected ripple on said motor.

* * * * *